United States Patent [19]
Gauthier et al.

[11] Patent Number: 5,528,415
[45] Date of Patent: Jun. 18, 1996

[54] COMPACT ENHANCED PERFORMANCE OPTICAL ISOLATOR USING A FARADAY ROTATOR

[75] Inventors: Daniel J. Gauthier, Durham, N.C.; Hugh G. Robinson, Superior, Colo.

[73] Assignee: Duke University, Durham, N.C.

[21] Appl. No.: 336,411

[22] Filed: Nov. 9, 1994

[51] Int. Cl.$^6$ .............................. G02B 5/30; G02B 27/28; G02F 1/09
[52] U.S. Cl. ...................... 359/282; 359/283; 359/484; 372/703
[58] Field of Search .................................. 359/281, 282, 359/484, 283; 372/703

[56] References Cited

U.S. PATENT DOCUMENTS

| H1155 | 3/1993 | Fratello et al. . |
|---|---|---|
| 3,360,323 | 12/1967 | Weisman et al. . |

(List continued on next page.)

FOREIGN PATENT DOCUMENTS

| 4-097216 | 3/1992 | Japan . | |
|---|---|---|---|
| 5-88113 | 4/1993 | Japan | 372/703 |

OTHER PUBLICATIONS

K. P. Birch, *A Compact Optical Isolator,* Optics Communications, vol. 43, No. 2, Sep. 15, 1982, pp. 79–84.
Zhu Huanan, *High Performance Magnets in China for Optical Isolators for 1064 nm and Near Infrared Wavelengths,* Optics Engineering Reports, Nov. 1991.
Gauthier et al., *Simple, Compact, High–Performance Permanent–Magent Faraday Isolator,* Optical Society of America, vol. 11, No. 10, Oct. 1986, pp. 623–625.
Wilson, *Optical Isolators Cut Feedback in Visible and Near–IR Lasers,* Laser Focus/Electro–Optics, Dec. 1988, pp. 103–108.
Manzi, *Terbium Gallium Garnet—Putting A New Spin On Things,* Lasers & Optronics, Feb. 1989, pp. 63–65.
DeShazer et al., *Optical Isolator for Near Infrared,* The Review of Scientific Insturments, vol. 38, No. 2, Feb. 1967, pp. 248–250.
Schmitt et al., *Permanent–Magnet Faraday Isolators for Q–Switched Nd:YAG Laser Applications,* SPIE vol. 912 Pulsed Single–Frequency Lasers: Technology and Applications (1988), pp. 206–213.
Shiraishi et al., *Compact Faraday Rotator for an Optical Isolator Using Magnets Arranged with Alternating Polarities,* Optical Society of America, vol. 11, No. 2, Feb. 1986, pp. 82–84.
Weber, *Faraday Rotator Materials for Laser Systems,* SPIE vol. 681 Laser and Nonlinear Optical Materials (1986), pp. 75–90.
Product Brochure of Litton Airtron, Jul. 1991.

*Primary Examiner*—Martin Lerner
*Attorney, Agent, or Firm*—Bell, Seltzer, Park & Gibson

[57] ABSTRACT

An optical isolator is disclosed that is particularly useful in the visible, infrared, and near-infrared portions of the electromagnetic spectrum. The rotator portion of the isolator produces a highly uniform magnetic intensity across its clear aperture. The optical isolator comprises a Faraday rotator that defines an optical axis, a respective polarizer on each end of the Faraday rotator and positioned on the optical axis, and a housing containing the Faraday rotator and the polarizers. The Faraday rotator comprises an optical rotator rod that defines the optical axis and a magnet assembly surrounding the optical rotator rod. The magnet assembly comprises eight trapezoidal cross section magnet sections arranged in a first group of four and a second group of four. The magnet sections in each group are placed adjacent one another along their respective nonparallel sides to form an overall square cross section for each group with a square cross section aperture through each group that surrounds the optical rotator rod. The first and second groups are arranged linearly adjacent to one another along the optical axis of the optical rod. The first group has its magnetic field perpendicular to and directed axially away from, the optical axis, and the second group has its magnetic field perpendicular to and directed axially towards, the optical axis of the optical rod.

26 Claims, 6 Drawing Sheets

U.S. PATENT DOCUMENTS

| | | |
|---|---|---|
| 3,944,329 | 3/1976 | Lee, Jr. et al. . |
| 3,971,723 | 7/1976 | Tajima et al. . |
| 4,178,073 | 12/1979 | Uchida et al. . |
| 4,522,473 | 6/1985 | Hibiya et al. . |
| 4,609,257 | 9/1986 | Shirasaki . |
| 4,612,500 | 9/1986 | Chen et al. . |
| 4,647,887 | 3/1987 | Leupold . |
| 4,671,621 | 6/1987 | Dillon, Jr. et al. . |
| 4,692,732 | 9/1987 | Leupold et al. . |
| 4,756,607 | 7/1988 | Watanabe et al. . |
| 4,764,743 | 8/1988 | Leupold et al. . |
| 4,818,080 | 4/1989 | Glasheen . |
| 4,856,878 | 8/1989 | Wilson et al. . |
| 4,909,612 | 3/1990 | Scerbak et al. . |
| 4,952,014 | 8/1990 | Lieberman et al. . |
| 4,960,331 | 10/1990 | Goldman et al. . |
| 4,969,743 | 11/1990 | Cote et al. . |
| 5,029,953 | 7/1991 | Dexter et al. . |
| 5,033,830 | 7/1991 | Jameson . |
| 5,048,937 | 9/1991 | Takeda et al. . |
| 5,052,786 | 10/1991 | Schutz . |
| 5,068,860 | 11/1991 | Hartemann et al. . |
| 5,078,512 | 1/1992 | Ando . |
| 5,087,984 | 2/1992 | Heiney et al. . |
| 5,115,340 | 5/1992 | Tidwell . |
| 5,127,019 | 6/1992 | Epstein et al. . |
| 5,161,049 | 11/1992 | Tanno et al. . |
| 5,204,771 | 4/1993 | Koga . |
| 5,216,400 | 6/1993 | Leupold . |
| 5,237,445 | 8/1993 | Kuzuta . |

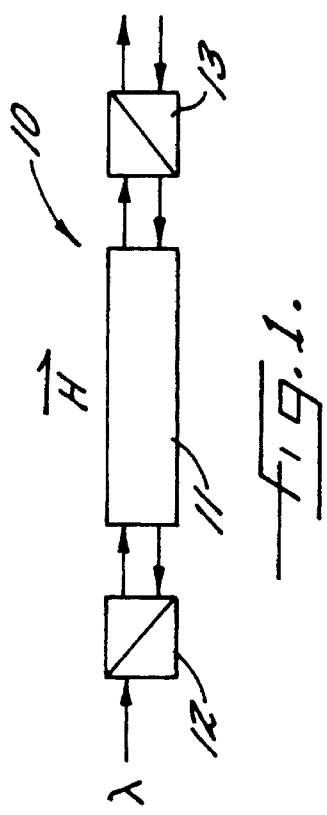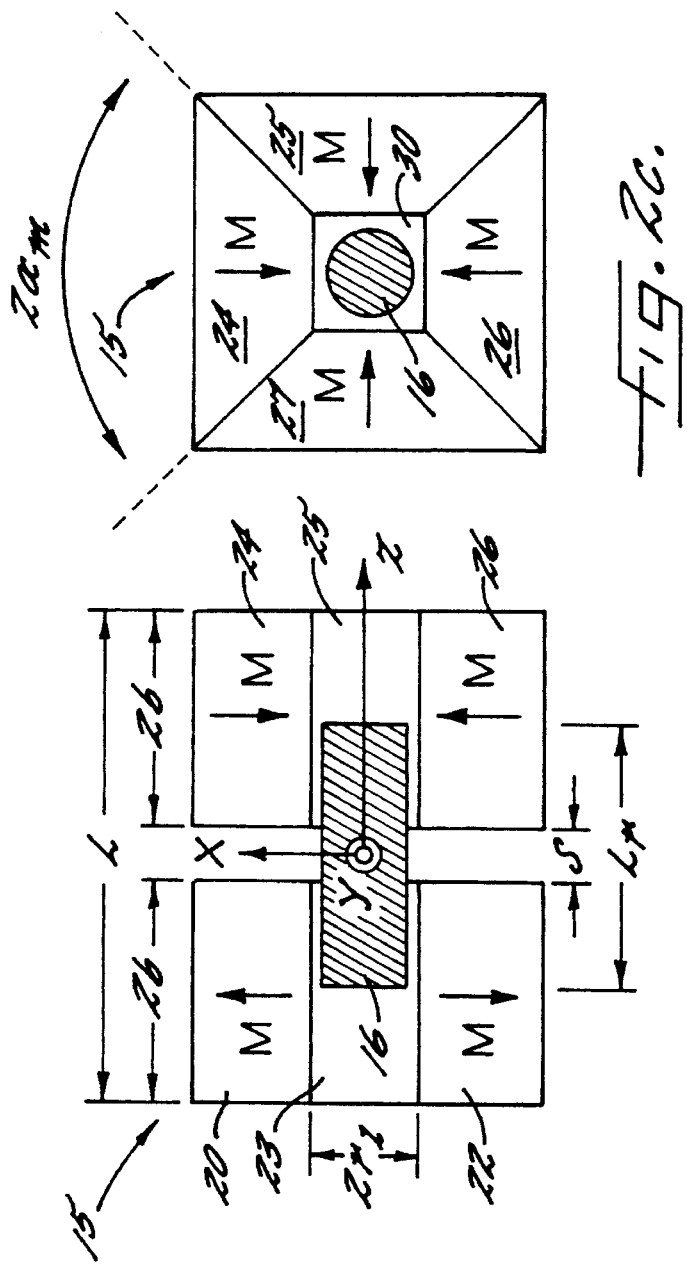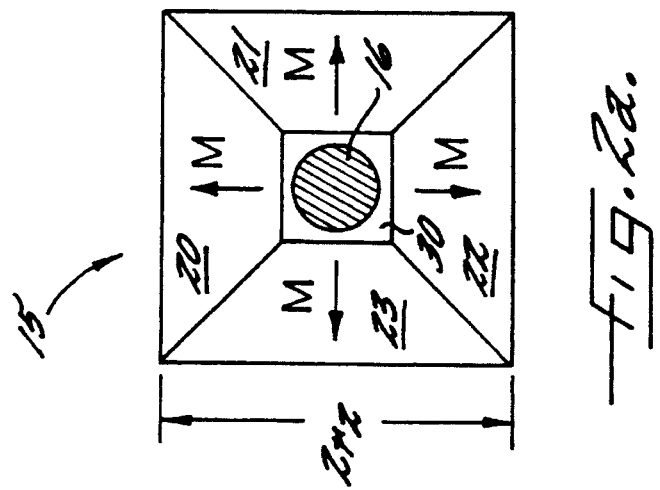

COMPACT ENHANCED PERFORMANCE OPTICAL ISOLATOR USING A FARADAY ROTATOR

This invention was made with Government support under Grant No. PHY-9357234-001 awarded by the National Science Foundation and Grant No. DAAL0392G0286 awarded by the Army Research Office. The Government has certain rights in the invention.

FIELD OF THE INVENTION

The present invention relates to a method and structure for producing a desired magnetic field in a defined position, and in particular relates to such methods and structures for Faraday rotators and optical isolators.

BACKGROUND OF THE INVENTION

An optical isolator is a device used to create an optical light valve; i.e. allowing light to travel in one direction, but not in the reverse. In practical terms, isolators are quite useful, and indeed often necessary, in controlling certain types of light and their functional applications. Optical isolators are often employed along with lasers in their various operations and applications because the isolators prevent undesired reflection of laser light back into the laser (i.e., "feedback"). Feedback is undesirable because it can cause destabilization, parasitic oscillations, optical damage and other significant problems if left uncontrolled. For example, isolators are used in laser-based optical communications devices that require stable oscillation of the laser, including laser diodes.

In most circumstances, an optical isolator will incorporate a structure referred to as a "Faraday rotator" to manage and control the behavior of light—particularly laser light—in a desired fashion. A Faraday rotator's operation and use are based upon the "Faraday effect," a term that refers to the rotation of the plane of polarization of light propagating through a medium in the presence of an externally applied magnetic field. The angle "$\theta$" to which the polarized light is rotated is proportional to the distance "$d$" that the light travels through the medium, to the magnetic field strength $<H>$ averaged along the optical axis, and to a characteristic of the medium referred to as the Verdet constant ("$V$"; degrees per Oersted-centimeter) of the medium; all according to the relationship: $\theta = V <H> d$.

The general structure of an optical isolator consists of a Faraday rotator flanked by two polarizers. The polarizers are usually oriented at 45° with respect to one another, and the Faraday rotator is typically selected to give a 45° rotation of its own. In turn, the Faraday rotator generally consists of a Faraday medium material (often referred to as an "optical rod" in visible and near-IR applications) placed within a structure of magnets that are intended to produce the desired magnetic field. In many conventional rotators, the magnets are generally cylindrical with a circular aperture that contains the optical rod. In one common embodiment, the cylindrical magnet assembly is formed of a longer central magnet flanked by two smaller magnets in the opposite pole-to-pole relationship commonly used to try to produce a high magnetic field along the Faraday medium.

Because of the relationship between rotation of the plane of polarization, the Verdet constant, the magnetic field strength, and the rod length, the main techniques for increasing or otherwise controlling the angle of rotation consist of selecting a material with a higher Verdet constant, increasing the magnetic field strength, or increasing the length of the optical rod. The Verdet constant is, however, fixed for any given material and any specific wavelength, and thus if the material selected for the optical rod is otherwise satisfactory (or for some applications, necessary), the only options are to increase the magnetic field or the length of the rod. Additionally, because the Verdet constant is inversely proportional to the square of the wavelength of the light being rotated, the length of optical rod required for a given rotation will increase as the wavelength increases. Furthermore, increasing the length ($d$) of the optical rod generally tends to increase absorption losses, the undesirable effect of self-focusing, cost, and limits the types of materials that can be used.

Increasing the magnetic field thus represents an attractive technique for obtaining the usually desired 45° angle of rotation from a Faraday rotator. Suggested techniques have included using larger numbers of smaller magnets. Unfortunately, obtaining higher magnetic field strength using more, but smaller magnets presents a number of practical problems, including the difficulties of assembling and packaging large numbers of small, high strength magnets in the opposing pole relationship typical of Faraday rotators.

As an additional problem, many of the common cylindrical magnet rotators suffer from uniformity problems. Specifically, the magnetic fields $<H>$ they produce tend to vary across the aperture, and are often weaker at the optical axis. The rotation they produce thus varies accordingly.

Therefore, the need exists for generally more compact optical isolators that produce the desired rotation at desired wavelengths with uniform magnetic fields while avoiding the problems presented by increasing the rod length, changing optical rod materials, or using an unwieldy number of frustratingly small magnets.

OBJECT AND SUMMARY OF THE INVENTION

Therefore, it is an object of the present invention to provide a compact optical isolator that incorporates a Faraday rotator, that is significantly smaller than standard isolators, and that produces a highly uniform rotation across its clear aperture.

The invention meets this object with an isolator that includes a Faraday rotator with polarizers on each end. The Faraday rotator comprises a Faraday medium (e.g., an optical rotator rod) that defines an optical axis, and a magnet assembly surrounding the Faraday medium. In a preferred embodiment, the magnet assembly comprises eight magnet sections arranged in a first group of four and a second group of four, each of the magnet sections comprising a solid polygon with a trapezoidal cross-section. The magnet sections in each group are positioned adjacent one another along their respective nonparallel sides to form an aperture through each group that surrounds the optical rotator rod. The first and second groups are arranged linearly adjacent to one another along the optical axis of the optical rod, with the first group having its magnetic field perpendicular to and directed axially away from the optical axis, and the second group having its magnetic field perpendicular to and directed axially towards the optical axis of the rod.

The foregoing and other objects, features and advantages of the invention, and the manner in which the same are accomplished, will be best understood from the detailed description of the invention taken in conjunction with the accompanying drawings which illustrate preferred and exemplary embodiments, and in which:

DESCRIPTION OF THE DRAWINGS

FIG. 1 is a schematic diagram of an optical isolator;

FIGS. 2(a), 2(b), and 2(c) are respective schematic cross-sectional views of a Faraday rotator according to the present invention.

DETAILED DESCRIPTION

Figure 3:
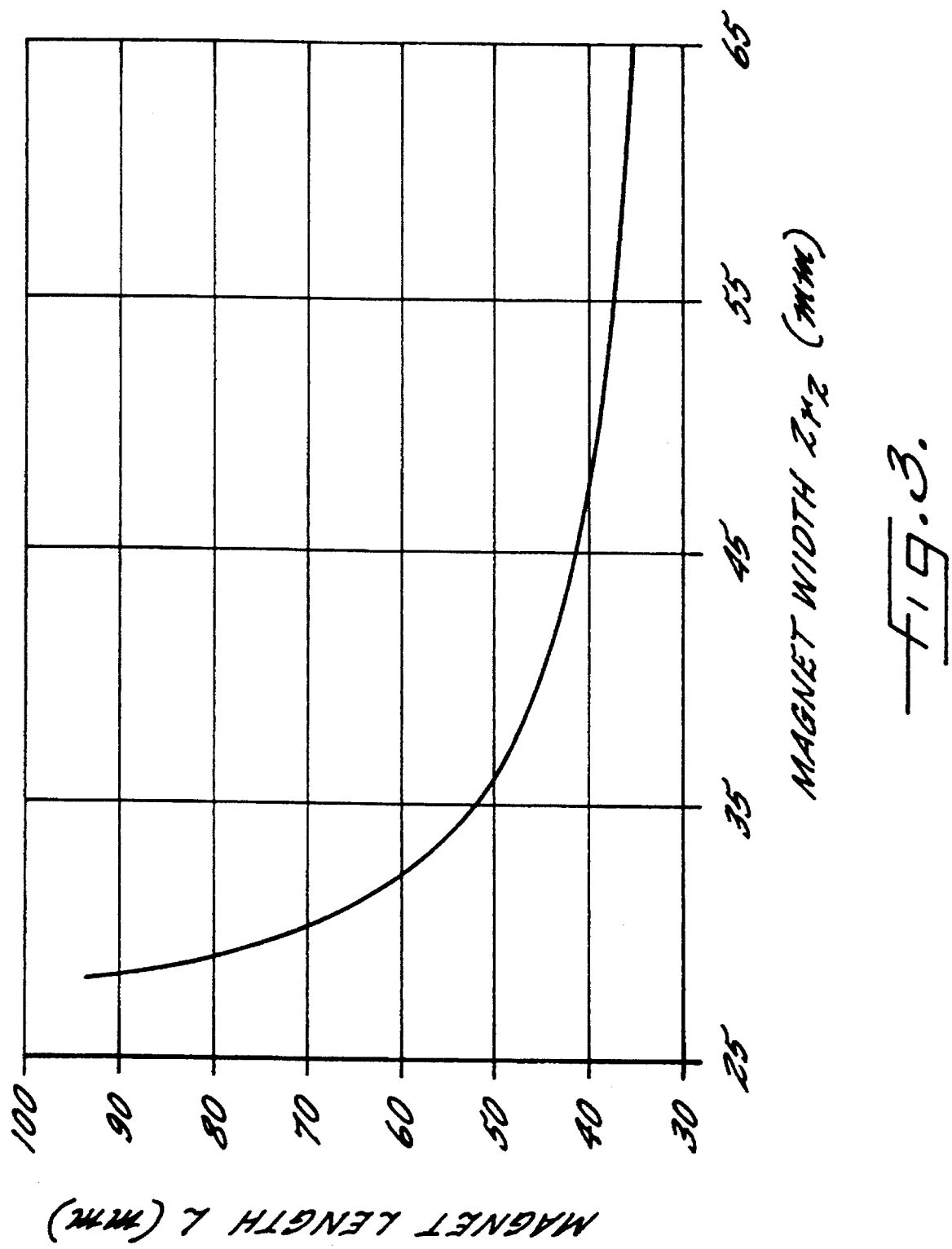
FIGS. 3–7 illustrate many different embodiments of a Faraday rotator that all produce approximately a 45° rotation angle for a specific choice of magnet material, rotator rod material, number of magnet sections, and aperture size.

The present invention is an optical isolator. The isolator, and the Faraday rotator that forms its main component, produces a highly uniform magnetic intensity across its clear aperture.

FIG. 1 is a schematic diagram of an isolator designated broadly at 10. The basic components of the isolator include the Faraday rotator 11 and the respective polarizers 12 and 13 on each end of the Faraday rotator 11. As will be set forth in more detail herein, the Faraday rotator 11 defines an optical axis, and the polarizers 12 and 13 are positioned along that optical axis. As designated by the vector symbol H, the rotator's magnetic field is directed along the direction of light propagation.

It will be understood that the term "optical axis" is used in its general sense to describe the path of light propagation, and that the term "optical rod" is not limited to cylindrical slopes per se, but that isolators according to the present invention can include multipass rods and isolators.

In typically preferred embodiments, the Faraday rotator 11 is designed to rotate light at about 45°, and thus the respective polarizers 12 and 13 are oriented at 45° with respect to one another for reasons that are generally well-known to those of ordinary skill in this art. In brief summary, the first polarizer 12 linearly polarizes the light, after which the Faraday rotator produces a rotation of 45° in the polarized light. The light thus passes unchanged ("unattenuated") through the second polarizer 13. Reflected or returning light is polarized by the second polarizer and is rotated another 45° by the Faraday rotator because the Faraday effect is nonreciprocal (i.e. does not depend on the direction of light propagation). Thus, the reflected light exiting the Faraday rotator is rotated a total of 90° with respect to the first polarizer 12, which in turn extinguishes or redirects the light, but in either case prevents it from returning along its original path.

In a specific example of the present invention, the Faraday rotator 11 produces a rotation of between about 43° and 49° in light having a wavelength of between about 500 and 1100 nanometers (nm) (i.e., between about 0.5 and 1.1 microns).

Appropriate polarizers can be selected by those of ordinary skill in this art without undue experimentation, provided that they meet the other requirements of the particular system with which the isolator is used. Typical polarizers include Glan-type polarizers, single crystal polarizers such as those made out of calcite ($CaCO_3$) or similar materials, thin film Brewster plates, or custom materials such as the silver crystal in glass matrix polarizers available under the POLARCOR trademark from Corning, Inc., Corning, N.Y.

FIG. 2 illustrates a Faraday rotator according to the present invention and broadly designated at 15. FIG. 2(a) is a front elevational view of the rotator 15, FIG. 2(c) is a rear elevational view, and FIG. 2(b) is a cross-sectional view taken along a side elevation.

According to the present invention, the rotator 15 comprises a Faraday medium illustrated as the optical rotator rod 16 that defines the optical axis Z of the rotator. The optical rod 16 is selected to have an appropriate Verdet constant, and generally will contain an ion—paramagnetic, diamagnetic, or ferromagnetic—that enhances the Faraday effect in the presence of the rotator's magnetic field. For example, in the visible and near IR regions, the optical rod 16 can comprise terbium-doped borosilicate glass or a terbium gallium garnet ("TGG") crystal.

An exemplary listing of Faraday media also includes crystalline materials such as $CdMnTe$, $EuF_2$, $Tb_3Al_5O_{12}$, $LiTbF_4$, $ZnSe$, $CeF_3$, $Bi_4Ge_3O_{12}$, and $LaF_3$; and various glasses such as borate doped with $Tb^{+3}$, borosilicate doped with $Tb^{+3}$, metaphosphate doped with $Pr^{+3}$ ($Pr(PO_3)_3$), fluorophosphate doped with $Tb^{+3}$, phosphate doped with $Ce^{+3}$, lead silicate, fused silica, and silicate.

The Faraday rotator includes a magnet assembly that surrounds the optical rotator rod 16 and that comprises eight magnet sections 20, 21, 22, 23, 24, 25, 26, and 27. The magnet sections are arranged in a first group of four (20, 21, 22, and 23), and a second group of four (24, 25, 26, and 27). Each of the magnet sections 20–27 comprises a solid polygon with a trapezoidal cross-section as best illustrated in FIGS. 2(a) and 2(c).

The magnet sections in each group are positioned adjacent one another along their respective nonparallel sides to form an aperture 30 through each group that surrounds the optical rotator rod 16. Depending upon the requirements of a given situation, the magnets in the first and second group can be in linear contact with one another, or as illustrated by FIG. 2(b), the first and second magnet groups can be linearly separated from one another. As FIGS. 2(a), (b), and (c) illustrate, in the most preferred embodiment, the magnet sections form an overall square cross-section for each group with a square cross-section for the aperture 30 therethrough.

In FIGS. 2(a), (b), and (c), the magnetic field and its applied direction are indicated by the letter "M" and the respective arrows. In an isolator and Faraday rotator according to the present invention, one of the groups will have its magnetic field perpendicular to and directed away from the optical axis Z and the other group will have its magnetic field perpendicular to and directed axially towards the optical axis Z. In the illustration of FIG. 2, magnet sections 20, 21, 22, and 23 form a group with the magnetic field directed axially away from the optical axis Z, while magnet sections 24, 25, 26, and 27 have their magnetic fields directed axially towards the optical axis Z.

In other embodiments, each of the trapezoidal magnet sections 20–27 can comprise two or more subsections that are also solid polygons and that form a trapezoidal cross-section when placed adjacent one another. Basically, increasing the number of magnet sections has certain advantages in terms of the applied magnetic field, but offers the technical difficulties mentioned earlier, particularly in the manufacture, handling and assembly of a greater number of smaller-size magnets of the strengths required for a Faraday rotator of this type.

As FIG. 2 further illustrates, in a most preferred embodiment, the trapezoidal magnet sections in each group are in direct contact with one another along their respective nonparallel sides. The magnet sections can be selected from any one of a number of suitable magnets with an appropriate field strength (e.g., on the order of about 14.5 Kilo-Oersted peak field strength for the embodiment of FIG. 2 with a 7.5 mm aperture) that are well-known to those of ordinary skill in this art and that can be selected without undue experimentation. In preferred embodiments, the magnets comprise rare-earth permanent magnets. As used herein, the term "rare-earth" refers to the 15 chemically-related elements in Group IIIB of the periodic table, and that are also referred to as the "Lanthanide series." Depending upon the wavelength or range of wavelengths with which the Faraday rotator is to be used, exemplary magnet materials include those such as samarium-cobalt (Sm-Co), or most preferably for visible and near-infrared wavelengths, neodymium-iron-boron (Nd-Fe-B).

In other applications, the magnet sections can comprise electromagnets, but the associated circuitry required can moderate some of the size advantages of the present invention. Thus, although electromagnets can be used, permanent magnets are presently preferred.

In practice, the Faraday isolator of the present invention is significantly smaller than standard visible and near-infrared isolators and produces a highly uniform rotation across its clear aperture 30. The novel magnet configuration of the present invention produces higher magnetic field strengths without degrading the performance of the rotator. A particularly unique advantage is that the overall size of the magnets does not scale rapidly with the size of the clear aperture, a characteristic that enables the production of enhanced-performance large-aperture isolators. The high uniform magnetic intensity across the aperture is crucial for high performance isolators based on Faraday effect rotator materials, because the rotation angle does not saturate significantly at the magnetic intensities that can be obtained with the permanent magnets. Other magnet configurations can produce highly uniform average magnetic intensities, but these require significantly larger magnets. In turn, larger magnets result in a significantly larger overall device than does the magnet configuration of the present invention for the same or similar performance specifications.

In particular, FIGS. 2(a), (b), and (c) also illustrate some of the characteristic parameters of a magnet configuration and a Faraday rotator according to the present invention. The magnet assembly has an overall length L (all of these designations appearing in FIG. 2) made up of a plurality (2m) of magnet pieces, each of which have length 2b, that have a trapezoidal cross-section. The nearest face of the trapezoid is located at a distance designated $r_1$ from the optic axis, and the farthest face is at a distance designated $r_2$. The full angle subtended by the trapezoid as viewed from the optic axis Z is designated $2\alpha_m$. As noted earlier herein, the magnet pieces that make up the left-hand side of FIG. 2(b) are oriented so that the magnetic field M points away from the optical axis, and that of the right-hand group point towards the optical axis. The separation between the first and second groups is designated by the letter "s," and the length of the rod "L" is preferably nearly equal to the sum of 2b plus the distance "s."

The magnet configuration according to the present invention produces significantly higher magnetic fields in comparison to previous designs. Based on observations of the performance of the present invention, the field strength appears to be enhanced in most situations for a fixed magnet length L and an aperture size 2r when the width of the magnet assembly ($2r_2$) is increased. Although the inventors do not wish to be bound by any particular theory, it appears that increasing the width of the magnet assembly increases the surface area of the diagonal faces between the trapezoidal magnet sections, and places the outer faces further from the optical axis. This tends to more than counteract the increase in surface area of the outer faces. The significant contribution of the diagonal faces to the on-axis rotation is quite important in designing such a high performance Faraday rotator, because these faces give rise to a radial and azimuthal variation of the angle of rotation. To date, it appears that the maximum magnetic field strength can be increased by separating the magnet halves by a small amount. Nevertheless, the same Faraday rotation angles can be obtained by taking "s" as zero and making small adjustments to the other design parameters.

Additionally, the magnetic field can be adjusted, and—as usually desired—made more uniform, by incorporating a magnet shim to adjust the magnetic field applied by the magnet assembly. In preferred embodiments, the magnet shim comprises either a relatively small cavity in one of the magnet sections, or alternatively, a relatively small appurtenance to one of the magnet sections.

EXAMPLE

As used herein, azimuthal uniformity represents the difference between the rotation along the portion of the aperture wall nearest the axis ($\theta_o$) and the portion of the aperture wall farthest from the axis ($\theta_{45°}$) divided by $\theta_o$. Radial uniformity represents the difference between $\theta_o$ and the rotation along the axis ($\theta_{axis}$), divided by $\theta_{axis}$. The radial and azimuthal uniformity are a measure of the quality of the Faraday isolator: better uniformity (smaller numerical value) implies better isolation.

A number of parameters can be adjusted to obtain the desired 45° rotation from the Faraday rotator. In order to demonstrate the advantages of the invention, the Verdet constant of the rotator material and the aperture size $r_1$ were fixed and other parameters adjusted to obtain the desired rotation angle. From a practical manufacturing standpoint, one of the more relevant parameters is the number of magnet pieces "m" because the complexity of the apparatus and techniques required to assemble the rotator increases with "m." To date, it appears that it could be beneficial to use a larger number of magnet pieces for applications that require ultimate size reduction, but the uniformity of rotation across the clear aperture in the radial direction degrades somewhat as a greater number of pieces are used.

In order to demonstrate the characteristics of the invention, all embodiments were identified that achieve 47° rotation and minimize the rotator rod length for a 7.5 millimeter clear aperture ($r_1$=4.13 mm) when used with a 1.064 micron laser when terbium-doped gallium garnet ("TGG") was used as the rotator medium, and neodymium-iron-boron rare-earth magnets for the magnet sections. This process was accomplished using the standard mathematical treatment of magnets and the Faraday effect, and was facilitated using a computer program written by the inventors. It was found that there are many embodiments that achieve the necessary 47° rotation. The various characteristics of the magnets and rotator rod for each of the embodiments with the respective performance characteristics are illustrated in FIGS. 3–7.

Figure 4:
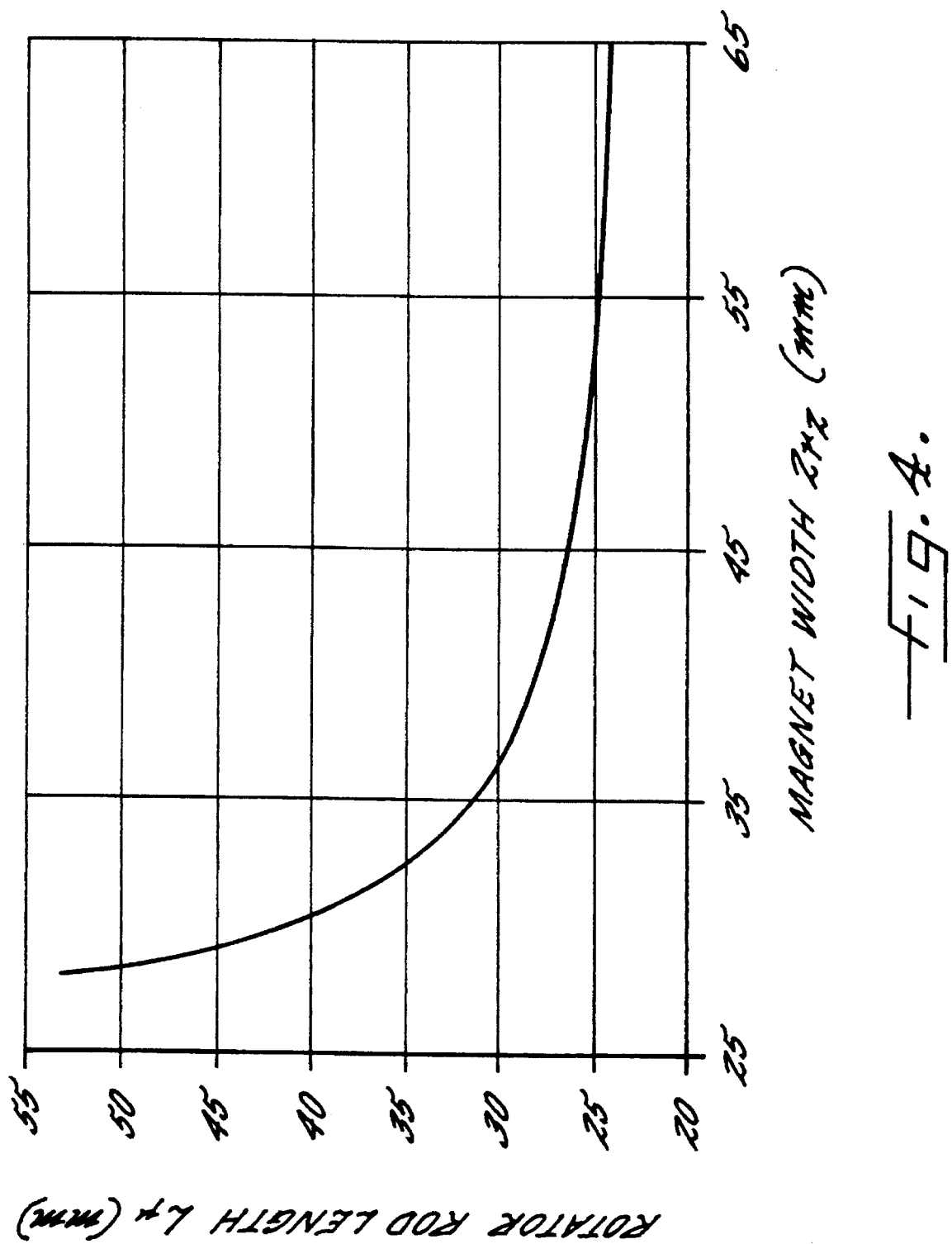
Figure 5:
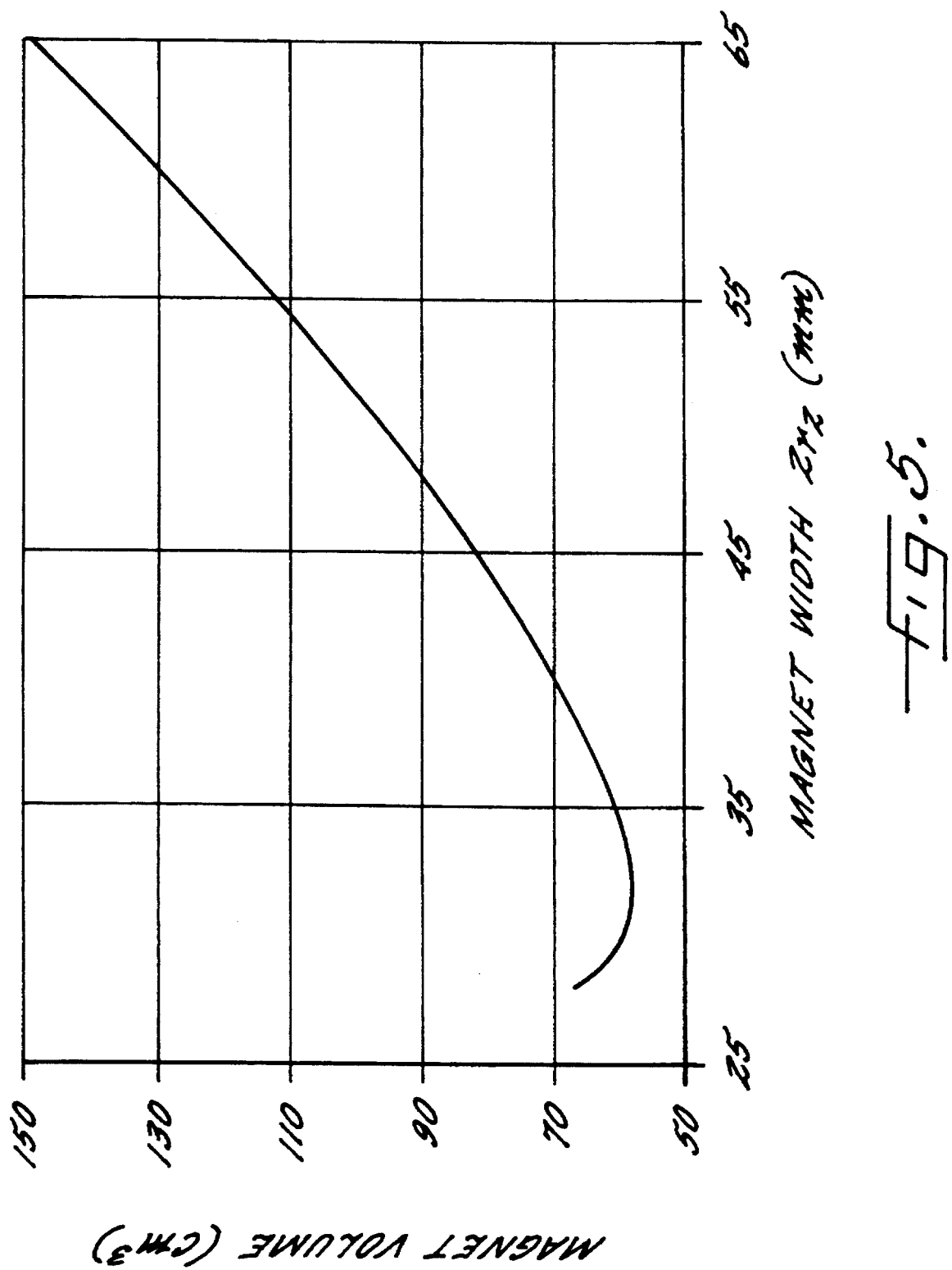
Figure 6:
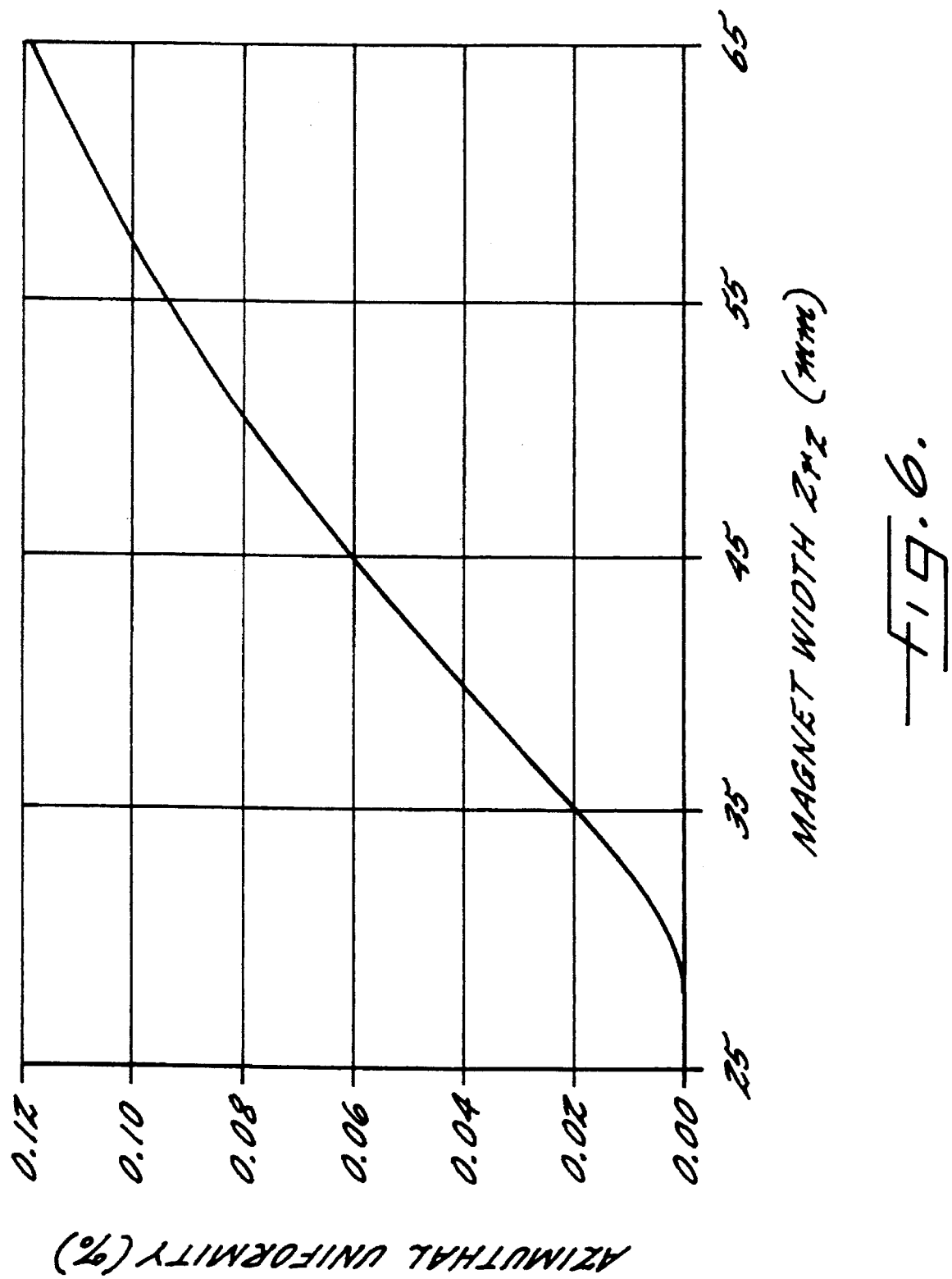
Figure 7:
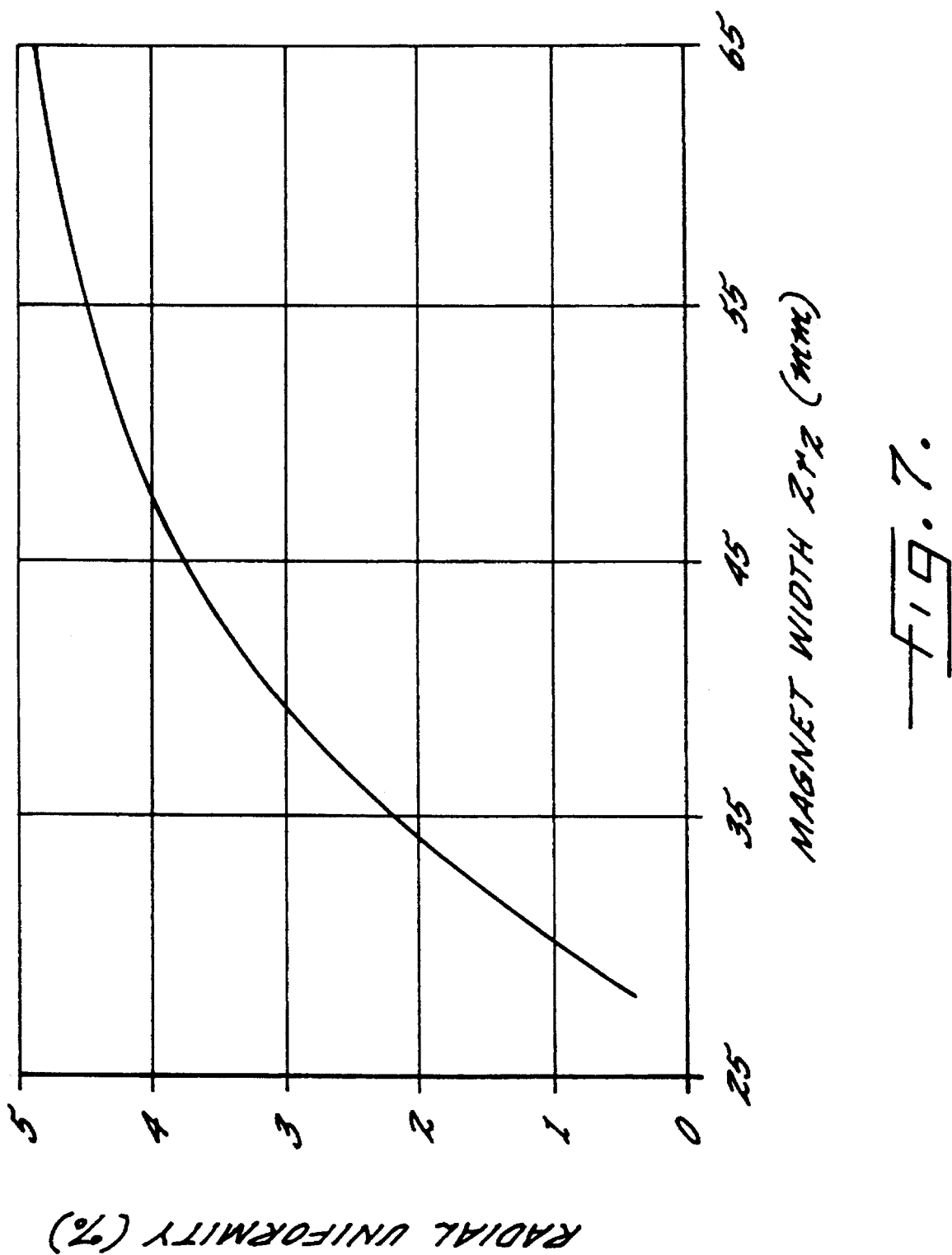

One specific embodiment is selected from the wide range of possible embodiments by choosing the magnet width ($2r_2$) and determining the necessary magnet length from FIG. 3, the rotator rod length from FIG. 4, and the magnet volume from FIG. 5. For this specific design, the azimuthal and radial uniformity can be determined from FIGS. 6 and 7, respectively. Thus, by a quick inspection of FIGS. 3–7, a designer can easily weigh the trade-offs that must be considered when deciding on a particular rotator design.

In summary, the invention provides a compact optical isolator based on a Faraday rotator that provides the same performance as larger structures, or alternatively better performance than similarly sized conventional structures. The invention further provides enhanced uniformity across larger apertures.

In the drawings and specification, there have been disclosed typical preferred embodiments of the invention, and although specific terms have been employed, they have been used in a generic and descriptive sense only and not for purposes of limitation, the scope of the invention being set forth in the following claims.

That which is claimed is:

1. An optical isolator that produces a highly uniform magnetic intensity across its clear aperture, said optical isolator comprising:

a Faraday rotator that defines an optical axis;

a respective polarizer on each end of said Faraday rotator and positioned on the optical axis;

said Faraday rotator comprising,
   a Faraday medium that defines the optical axis; and
   a magnet assembly surrounding said Faraday medium;
   said magnet assembly comprising eight trapezoidal cross section magnet sections arranged in a first group of four and a second group of four,
   said magnet sections in each group being placed adjacent one another along their respective nonparallel sides to form an overall square cross section for each group with a square cross section aperture through each group that surrounds said Faraday medium;
   said first and second groups being arranged linearly adjacent to one another along the optical axis of the Faraday medium;
   said first group having its magnetic field perpendicular to and directed axially away from, the optical axis; and
   said second group having its magnetic field perpendicular to and directed axially towards, the optical axis.

2. An optical isolator according to claim 1 wherein said Faraday medium comprises an optical rod.

3. An optical isolator according to claim 1 wherein said polarizers are oriented at 45° with respect to one another.

4. An optical isolator according to claim 1 wherein said Faraday rotator produces a rotation of between about 43 and 49 degrees in light having a wavelength of between about 500 and 1100 nanometers (0.5–1.1. microns).

5. An optical isolator according to claim 1 wherein said polarizers comprise Glan-type polarizers.

6. An optical isolator according to claim 1 wherein said polarizers are selected from the group consisting of: single-crystal polarizers, Brewster polarizers, and silver particles imbedded in borosilicate glass.

7. An optical isolator according to claim 1 wherein said Faraday medium comprises a crystalline material selected from the group consisting of: terbium gallium garnet crystal, CdMnTe, $EuF_2$, $Tb_3Al_5O_{12}$, $LiTbF_4$, ZnSe, $CeF_3$, $Bi_4Ge_3O_{12}$, and $LaF_3$.

8. An optical isolator according to claim 1 wherein said Faraday medium comprises a glass selected from the group consisting of: borate doped with $Tb^{+3}$ borosilicate doped with $Tb^{+3}$, metaphosphate doped with $Pr^{+3}$ ($Pr(PO_3)_3$), fluorophosphate doped with $Tb^{+3}$, phosphate doped with $Ce^{+3}$, lead silicate, fused silica, and silicate.

9. An optical isolator according to claim 1 and further comprising a housing containing said Faraday rotator and said polarizers.

10. A Faraday rotator that produces a highly uniform magnetic intensity across its clear aperture, said Faraday rotator comprising:

an optical rotator rod that defines an optical axis; and a magnet assembly surrounding said optical rotator rod;

said magnet assembly comprising eight magnet sections arranged in a first group of four and a second group of four, each of said magnet sections comprising a solid polygon with a trapezoidal cross-section;

said magnet sections in each group being positioned adjacent one another along their respective nonparallel sides with their respective shortest sides perpendicularly adjacent one another to form an aperture defined by said shortest sides through each group that surrounds said optical rotator rod;

said first and second groups being arranged linearly adjacent to one another along the optical axis of the optical rod;

said first group having its magnetic field perpendicular to and directed axially away from, the optical axis; and said second group having its magnetic field perpendicular to and directed axially towards, the optic axis of the optical rod.

11. A Faraday rotator according to claim 10 wherein each of said trapezoidal magnet sections comprises two or more subsections that are solid polygons and that form a trapezoidal cross section when placed adjacent one another.

12. A Faraday rotator according to claim 10 wherein said trapezoidal magnet sections are in direct contact with one another along their respective nonparallel sides.

13. An optical isolator according to claim 10 wherein said optical rod medium comprises a crystalline material selected from the group consisting of: terbium gallium garnet crystal, CdMnTe, $EuF_2$, $Tb_3Al_5O_{12}$, $LiTbF_4$, ZnSe, $CeF_3$, $Bi_4Ge_3O_{12}$, and $LaF_3$.

14. An optical isolator according to claim 10 wherein said optical rod comprises a glass selected from the group consisting of: borate doped with $Tb^{+3}$, borosilicate doped with $Tb^{+3}$, metaphosphate doped with $Pr^{+3}$ ($Pr(PO_3)_3$), fluorophosphate doped with $Tb^{+3}$, phosphate doped with $Ce^{+3}$, lead silicate, fused silica, and silicate.

15. A Faraday rotator according to claim 10 wherein said optical rod contains a paramagnetic ion.

16. A Faraday rotator according to claim 10 wherein said optical rod contains a diamagnetic ion.

17. A Faraday rotator according to claim 10 wherein said optical rod contains a ferromagnetic ion.

18. A Faraday rotator according to claim 10 wherein said magnet sections comprises rare-earth permanent magnets.

19. A Faraday rotator according to claim 18 wherein said magnet sections comprise neodymium iron boron permanent magnets.

20. A Faraday rotator according to claim 18 wherein said magnet sections comprise samarium-cobalt permanent magnets.

21. A Faraday rotator according to claim 10 wherein said first and second magnet groups are in linear contact with one another.

22. A Faraday rotator according to claim 10 wherein said first and second magnet groups are linearly separated from one another.

23. A Faraday rotator according to claim 10 wherein said magnet sections form an overall square cross section for each group with a square cross section aperture therethrough.

24. A Faraday rotator according to claim 10 wherein said magnet assembly further comprises a magnet shim for adjusting the magnetic field applied by the magnet assembly.

25. A Faraday rotator according to claim 24 wherein said magnet shim comprises a relatively small cavity in one of said magnet sections.

26. A Faraday rotator according to claim 24 wherein said magnet shim comprises a relatively small appurtenance to one of said magnet sections.

* * * * *

UNITED STATES PATENT AND TRADEMARK OFFICE
CERTIFICATE OF CORRECTION

PATENT NO. : 5,528,415

DATED : June 18, 1996

INVENTOR(S) : Gauthier et al.

It is certified that error appears in the above-identified patent and that said Letters Patent is hereby corrected as shown below:

Column 3, line 41, after "polarizer" insert --13,--.

Signed and Sealed this

Fourth Day of March, 1997

*Attest:*

BRUCE LEHMAN

*Attesting Officer*     *Commissioner of Patents and Trademarks*